United States Patent [19]    [11] Patent Number: 5,327,800
Van Selous                    [45] Date of Patent:    Jul. 12, 1994

[54] SYSTEM USING VERTICAL EXHAUST PASSAGE FOR MAINTAINING PRIMED CONDITION OF HYDRAULIC CIRCUITS OF AN AUTOMATIC TRANSMISSION

[75] Inventor: Joseph S. Van Selous, Highland, Mich.

[73] Assignee: Ford Motor Company, Dearborn, Mich.

[21] Appl. No.: 1,606

[22] Filed: Jan. 7, 1993

[51] Int. Cl.⁵ ............................................ F15B 13/044
[52] U.S. Cl. ................................. 475/131; 137/593; 137/625.69; 475/116
[58] Field of Search ............... 251/282; 137/625.69, 137/593; 74/868, 869

[56] References Cited
U.S. PATENT DOCUMENTS

| | | | |
|---|---|---|---|
| 3,426,997 | 2/1969 | Vanderlaan | 251/120 |
| 3,473,566 | 10/1969 | Peppel | 137/625.69 |
| 3,589,401 | 6/1971 | Harding | 137/625.67 |
| 3,785,614 | 1/1974 | Enomoto | 74/869 X |
| 4,009,730 | 3/1977 | Starling | 137/625.69 |
| 4,056,991 | 11/1977 | Sakai et al. | 74/863 |
| 4,161,895 | 7/1979 | Ushijima et al. | 74/867 |
| 4,827,981 | 5/1989 | Livecchi et al. | 137/625.69 |
| 4,856,381 | 8/1989 | Funahashi et al. | 74/867 |
| 4,903,551 | 2/1990 | Hiramatsu et al. | 74/869 |
| 4,919,012 | 4/1990 | Bolz | 74/867 |
| 4,943,921 | 7/1990 | Baltusis et al. | 74/866 |
| 5,247,965 | 9/1993 | Oka et al. | 137/625.69 X |

Primary Examiner—Leslie A. Braun
Assistant Examiner—Khoi Q. Ta
Attorney, Agent, or Firm—Frank G. McKenzie; Roger L. May

[57]    ABSTRACT

A manual valve for an automotive transmission includes a valve spool defining lands having a relatively large diameter and a land having a relatively smaller diameter. Regulated line pressure supplied to the manual valve is selectively connected to and disconnected from passages that are pressurized when the gear selector is moved among a reverse drive range, overdrive range, and several manual ranges. Friction elements, supplied with hydraulic pressure through these passages, are engaged and disengaged to produce the various gear ratios of the transmission. When each friction element is disengaged, it is vented through an exhaust passage extending from the manual valve to a point that is vertically high in relation to the other passages of the circuit.

17 Claims, 2 Drawing Sheets

SYSTEM USING VERTICAL EXHAUST PASSAGE FOR MAINTAINING PRIMED CONDITION OF HYDRAULIC CIRCUITS OF AN AUTOMATIC TRANSMISSION

BACKGROUND OF THE INVENTION

Field of the Invention

It is conventional practice in the operation of an actuation and control circuit of an automatic transmission to vent hydraulic fluid from the circuit to a low pressure drain or sump at various locations throughout the circuit. Various friction elements of the transmission, i.e., hydraulically actuated clutches, brakes and servos, are engaged and released to produce gear ratio changes. Hydraulic fluid at elevated pressure is supplied to several friction element, each having a hydraulic piston located within a cylinder, thereby causing frictional contact among stacked friction plates connected to the driving and driven members.

When the friction element is disengaged during a gear ratio change, the torque capacity of the friction element is lowered by venting hydraulic fluid from the cylinder to a low pressure sump located below the circuit. While venting the portion of the hydraulic circuit that connects the friction element to the source of line pressure, it is possible for air to enter the passages of that portion of the circuit. Thereafter, when a gear ratio change requires reengagement of that friction element, air within those passages is either displaced by hydraulic fluid supplied to the friction element or is compressed within the passages by the pressurized hydraulic fluid traveling to the oncoming friction element. This process of displacing air or compressing air within the passages produces a detectable delay between placement of the gear selector mechanism by the vehicle operator in the desired position and completed engagement of the friction element that produces the selected gear ratio. This delay is frequently unacceptable to the vehicle operator.

Movement of the gear selector lever by the vehicle operator is linked to a manual valve, a component in the actuation and hydraulic control circuit that is supplied with regulated line pressure and directs line pressure selectively to output ports in the manual valve that correspond to the position of the gear selector lever. For example, if the gear selector is moved to a drive range (D or OD), the manual valve connects the regulated line pressure source to an output port through which all of the passages of the hydraulic circuit required to be pressurized to produce the selected gear ratios are pressurized. When the gear selector is moved from a forward drive position to the reverse position, the manual valve closes the output port that supplies pressure to the passages requiring pressurization in the forward drive condition and instead connects the line pressure source to an output port that pressurizes the lines required to be pressurized to produce reverse drive. However, if the pressurized fluid in the offgoing friction element is permitted to drain to a low pressure sump, delay in engaging the desired gear ratio after moving the selector lever to the selected position will occur nonetheless.

Various attempts have been devised to avoid this delay. For example, the manual valve of some automatic transmissions is constructed so that the drain passage is connected to the low pressure sump through a drain passage having an opening to the sump that is elevated in relation to the elevation of the manual valve and extends preferably to the highest point in the hydraulic circuit. Manual valves used in combination with the elevated exhaust passage require a long drain passage at one end of the manual valve and a corresponding length at the opposite end. These lengths contribute to increasing the overall size of the manual valve in comparison to a conventional manual valve, which merely connects the drain for exhaust passages directly to the low pressure sump. Consequently, additional space must be dedicated to the manual valve in the valve body, the compact compartment containing all of the control valves of the hydraulic control circuit. Space within the labyrinth produced by passages of the hydraulic circuit and valves connected by passages is at a premium; therefore, additional space for any valve such as the manual valve is undesired.

SUMMARY OF THE INVENTION

A preferred solution to drain down and the resulting shift delay in automatic transmissions is to provide a short manual valve that prevents drain down of hydraulic fluid from the circuit connected to oncoming and offgoing friction elements through the manual valve.

In realizing this objective, the control system according to this invention includes a manual valve having a minimum number of outlet ports, a line pressure inlet port, drain passages adjacent each of the outlet ports and connections between the drain passages the manual valve and an elevated end of a drain passage located at a point within the transmission casing higher than any of the other portions of the actuation and control circuit. The elevated end of the drain passage leads to a low pressure sump.

Each of the friction elements supplied with hydraulic fluid is connected to the low pressure sump only through the manual valve drain passages through the elevated drain passage that leads to the low pressure sump. Therefore, hydraulic pressure from each of the offgoing friction elements during a gear ratio change is returned to the low pressure sump through the manual valve and the upwardly directed drain passage so that a pressure head is continually maintained within the drain passage and available at the output ports of the manual valve. Accordingly, when the position of the gear selector lever moves the manual valve spool between range positions, the portion of the hydraulic circuit that is opened to the regulated line pressure source through the manual valve is held at a continual elevated pressure. The portion of the circuit leading to the oncoming friction element is certain to be filled with hydraulic fluid and will contain no voids or air spaces. In this way, there will be no delay attributed to voids in the pressure lines and components, between the time when the selector lever and manual valve are moved to the desired position and completed engagement of the selected gear ratio.

DESCRIPTION OF THE PREFERRED EMBODIMENT

Figure 1:
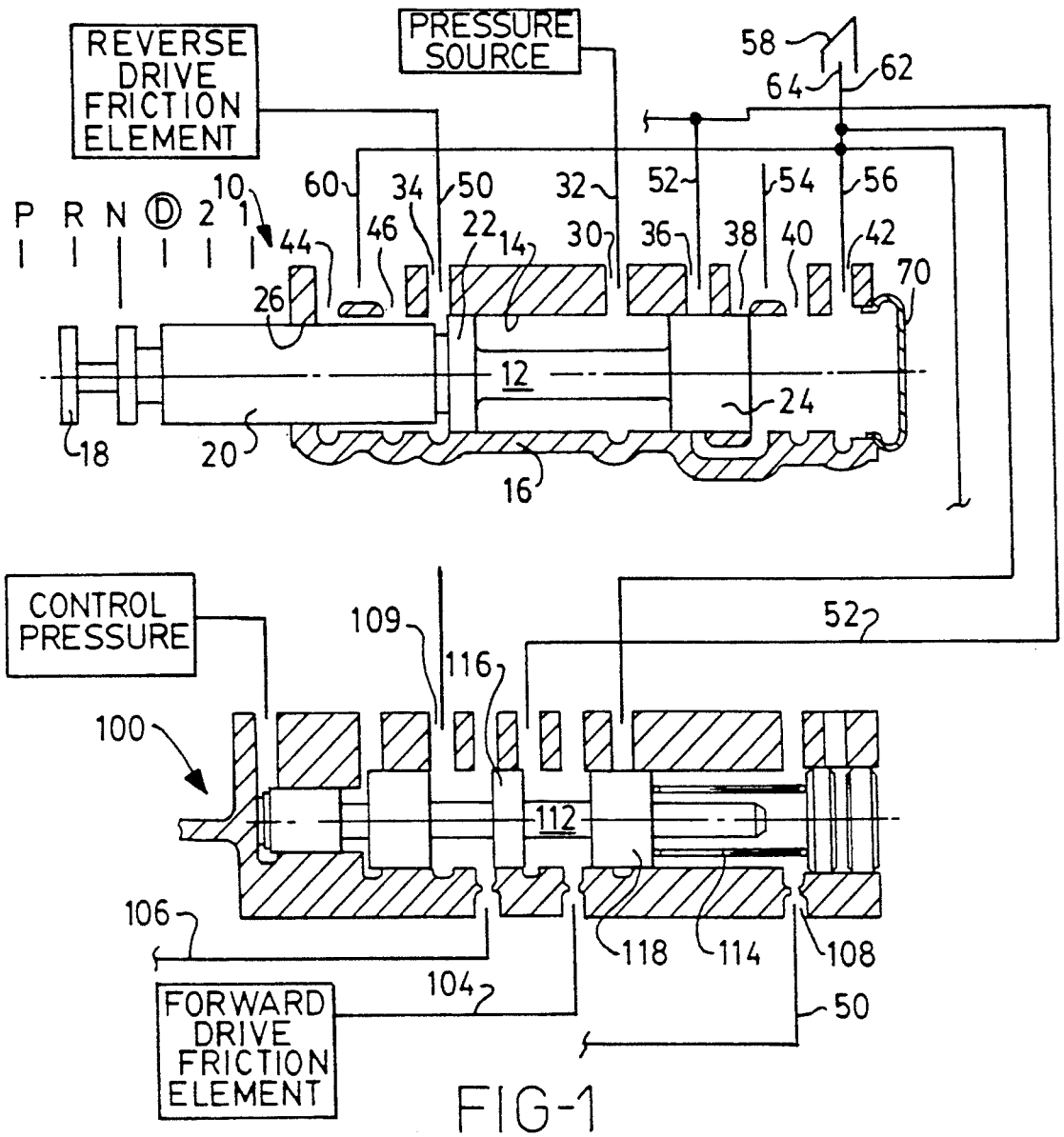
FIG. 1 is a schematic diagram of the system according to the invention.

Referring first to FIG. 1, a manual valve 10 includes spool 12 located in a chamber or bore 14 formed in the valve body 16. The spool is formed with first and second lands 18, 20 having a relatively small diameter and third and fourth lands 22, 24 having a slightly larger diameter. The valve chamber 14 has a first, longer diameter portion to accommodate lands 22, 24 and a second smaller diameter portion 26 of substantially the same diameter as the diameter of lands 18 and 20.

The valve spool 12 is moved along the axis of chamber 14 among the various positions to which the gear selector of the automatic transmission is moved manually by a vehicle operator. Those positions include PARK, REVERSE, NEUTRAL, FORWARD, MANUAL 2, and MANUAL 1 ranges. In FIG. 1, the valve spool is shown located in the neutral position.

The valve body is formed with several ports through which various passages of the hydraulic circuit are connected. A supply port 30 connects chamber 14 with a source of regulated line pressure through passage 32. As spool 12 moves within the valve chamber, the various lands of the spool open and close communication between port 30 and reverse port 34, forward port 36, manual ports 38, 40 and exhaust ports 42, 44, 46.

Reverse port 34 is connected by hydraulic passage or line 50 to the portions of the hydraulic, circuit that are pressurized when reverse drive selected. Passage 52 connects forward port 36 to the portions of the hydraulic circuit that are pressurized when the gear selector is located in the forward drive portion. Passage 54 connects manual ports 38 and 40 to the portions of the hydraulic circuit that are pressurized when the gear selector is moved to the Manual 1 and Manual 2 range positions.

Exhaust passage 56 connects exhaust port 42 to an exhaust or vent 58, and exhaust passage 60 connects exhaust ports 44 and 46 to the exhaust or vent 58. Passages 56 and 60 are mutually connected to exhaust passage 62, which is directed vertically from the location of the valve body 16 to an open end 64, which is located substantially vertically higher than chamber 14 and the passages that carry fluid to and from the friction elements. If exhaust passages 56, 60 and 62 are filled with hydraulic fluid, excess fluid returns to the low pressure sump after it exits through end 64.

In operation, when the gear selector is located in the NEUTRAL position, lands 22 and 24 close communication between supply port 30 and any of the other ports of the manual valve. When the gear selector is moved to the PARK position, land 24 closes supply port 30 so that none of the other ports of the manual valve are pressurized.

When manual valve spool 12 is moved leftward to the reverse position from the neutral position shown in FIG. 1, land 22 opens a connection between passage 32 and passage 50, and land 24 closes communication between passage 32 and ports 36, 38, 40 and 42. Land 22 closes communication between supply passage 32 and exhaust ports 44 and 46.

When the gear selector lever is moved to the forward position, spool 12 moves and opens a connection between passage 32 and forward passage 52 and maintains closed any connection between passage 32 and the other ports of the manual valve.

When the gear selector lever is moved to the MANUAL 2 range, land 24 opens communication among supply passage 32, forward passage 52 and manual passage 54, but land 22 closes communication among passage 32 and ports 44, 46 and 34. Similarly when the gear selector is moved to the MANUAL 1 position, land 24 opens communication among supply passage 32, forward port 36, exhaust port 42, and manual ports 38 and 40; land 22 maintains closed any communication among passage 32 and ports 34, 44, and 46.

When reverse passage 50 is closed by land 22 to the supply passage 32 there is a continual open connection between passage 50 and exhaust passage 60 through exhaust ports 44 and 46. This open connection between exhaust passage 60 and reverse passage 50 is a result of the smaller diameter land 20 and the diameter of land 22. At the right hand end of manual valve 10, the end of chamber 14 is continually connected through exhaust passage 56 and 62 to the low pressure sump so that no pressure force can operate on the end face of land 24.

Chamber 14, is sealed by a cap 70 resiliently retained on the end of the valve body by an interference fit on the inside diameter of the bore.

Figure 2:
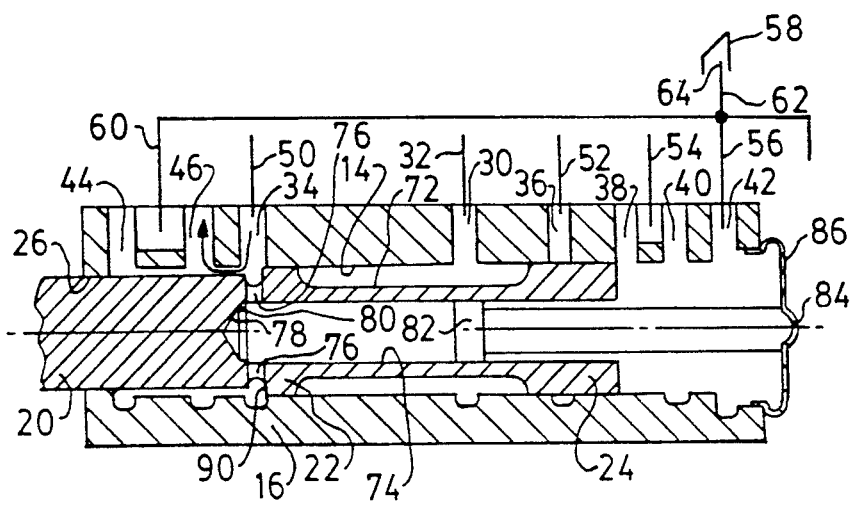
FIG. 2 is a modified version a manual valve for use with the system of FIG. 1.

The valve spool 72 of the manual valve shown in FIG. 2 includes first and second lands 18 and 20, third and fourth lands 22 and 24, and various ports and passages located and operating as described above with respect to the valve of FIG. 1. However, spool 72 is formed with a partial bore 74 extending from the right hand end face of land 24 to a plane located at the left hand side of land 22. Four radially directed passages 76 are drilled through the wall thickness of spool 72 into bore 74. The terminal end of the bore is formed with a conical surface 78 and an annular surface 80. The combined cross sectional areas of surfaces 80 and 78 taken perpendicular to the longitudinal axis of the spool is substantially equal to the difference in cross sectional area of land 20 and land 22.

Piston 82 is located within bore 74 and supported partially on the interior surface of bore 74 and partially by a mechanical attachment at 84 to the cap 86 that is resiliently supported on a surface of the valve body. Cap 86 hydraulically seals the interior of chamber 14 against the passage of hydraulic fluid. Piston 82 seals bore 74.

In operation when the gearshift lever and spool 72 are moved from the REVERSE position to the NEUTRAL position shown in FIG. 2, hydraulic fluid exiting the reverse circuit through passage 50 and port 34 develops a pressure force on the end face 90 of land 22 because of the larger cross sectional area of land 22 in comparison to that of land 20. This pressure force biases valve spool 72 rightward tending to move the spool in the direction of the forward drive position of the spool. However, because the same pressure exists within bore 74 due to the connection made by radial passages 76, a pressure force of equal magnitude is developed on surfaces 80 and 78 and is directed leftward, opposite to the direction of the pressure force developed on surface 90. In this way, the total pressure forces on surfaces 78, 80, 90 and the end of land 20 are self balanced, thereby eliminating any unbalanced pressure force on the spool.

Referring again to the system of FIG. 1, a 3-4 shift valve 100, which controls operation of an overdrive clutch, directs hydraulic fluid through passage 104 to engage the clutch and returns fluid from the clutch through passage 104 to valve 100. Passage 106 carries hydraulic fluid from valve 100 to a coast clutch valve, which operates to overcome overrunning of a one-way clutch and provide engine braking. The reverse passage 50 carries hydraulic fluid to ports 108, 109 of valve 100. Pressure controlled by a solenoid-operated control valve alternately pressurizes passage 110 and the left-hand end of the valve spool 112 and vents passage 110 and the valve end. Forward pressure in passage 52 communicates with the 3-4 shift valve through another port. An exhaust passage 114 is connected to exhaust passage 62.

When 3-4 shift valve 100 is in the position shown in FIG. 1, forward pressure passage 52 and passage 104 are connected through the valve such that regulated line pressure is delivered to the OD clutch 102 thereby engaging that clutch. However, when clutch 102 is to be disengaged, spool 112 moves rightward against the effect of spring 115 due to the effect of a pressure force developed on the lefthand end of the valve. This action causes land 116 to close communication between passages 52 and 104 and causes land 118 to open communication between passages 114 and 104.

This arrangement is typical of the shift valves and friction elements in the transmission. When a friction element or brake servo is to be pressurized, the corresponding shift valve opens communication between either the reverse line 50, passage 52 or manual passage 54 and the friction element. When the friction element is to be disengaged, the hydraulic cylinder associated with the friction element is connected to the exhaust passage 62 through the corresponding shift valve. None of the friction elements are vented directly to sump; instead, each friction element is connected to sump through exhaust passage 62.

In this way, hydraulic fluid is maintained in all of the passages that supply each of the friction elements because hydraulic fluid is maintained in the vertically high exhaust passage 62, whose end 64 is located vertically above the passages that supply pressurized hydraulic fluid to the friction element.

Figure 3:
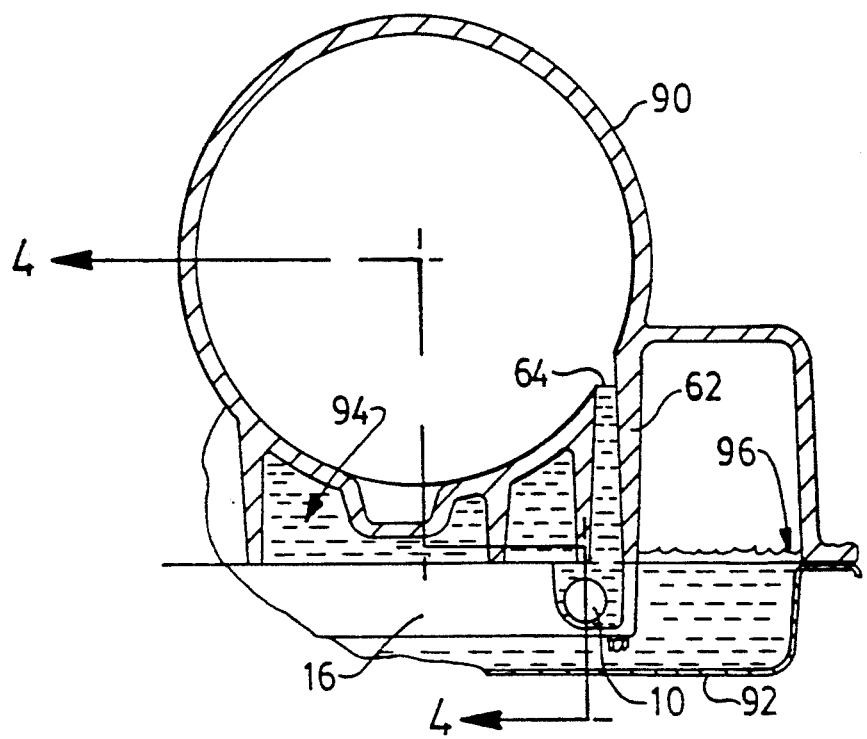
FIG. 3 is a cross section taken at plane 3—3 of FIG. 4 through the transmission casing, valve body and sump.
Figure 4:
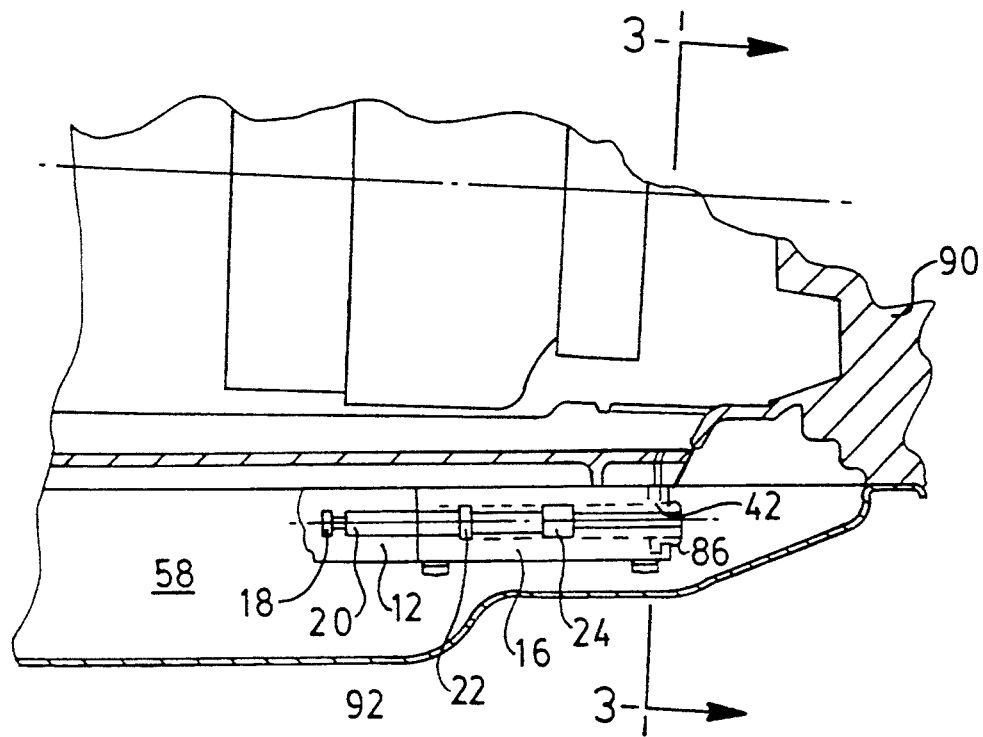
FIG. 4 is a partial cross section taken at plane 4—4 of FIG. 3.

Referring now to FIGS. 3 and 4, the rotating elements of the transmission are housed in a transmission casing 90 located vertically above a low pressure oil pan or sump 58, from which hydraulic fluid is drawn to the inlet of an hydraulic pump that pressurizes the hydraulic circuit and to which fluid is returned through the exhaust passages of the hydraulic system. The control valve body 16 contains valves, orifices other components, and passages, which direct fluid under pressure to the torque converter, brake band servos, hydraulically-actuated clutches and brakes that control operation of the transmission. Among the valves located in the valve body is manual valve 10. The hydraulic passages that carry hydraulic fluid from the valve body to the hydraulically-actuated friction elements and brake servos are located in spaces 94. The exhaust or vent passage 62 extends vertically upward from manual valve 10 to an end 64, located vertically higher than the other passages of the hydraulic circuit that supply fluid to the friction elements and brake servos. Hydraulic fluid carried in exhaust passage 62 can exit that passage through end 64 for return to the sump 58 by gravity. The normal level of the hydraulic fluid within the sump is indicated at 96.

I claim:

1. A system for pressurizing and venting friction elements of an automatic transmission, comprising:
a source of pressurized fluid;
a sump having a fluid level;
a hydraulically actuated first friction element;
manual valve means having a spool defining several lands moved among various positions within the manual valve means, each position associated with locating one or more of the lands of the spool to produce an hydraulic communication through the manual valve means, a first land having a relatively small control area for slideably supporting the spool on a valve body, mutually spaced larger lands for alternately connecting and disconnecting the pressure source, exhaust passage means and first friction element; and
exhaust passage means extending vertically above the sump fluid level and manual valve means, for connecting the manual valve means and first friction element to the sump.

2. The system of claim 1 wherein the exhaust passage means comprises a duct hydraulically connected to the manual valve means and first friction element, extending vertically therefrom to an end located above said sump level, said end communicating with the sump.

3. The system of claim 1 wherein the system further comprises a control valve means hydraulically connected to the manual valve means, a second friction element, and a source of control pressure, the control valve means movable among various positions, each position producing an hydraulic communication through the control valve means due to application and removal of control pressure, for alternately connecting the pressure source and exhaust passage means to the second friction element.

4. The system of claim 3 wherein the control valve means comprises:
a valve spool located in a valve bore and supported therein for sliding movement, the spool having control lands;
the valve bore connectable to the pressure source through operation of the manual valve means, exhaust passage means, control pressure source, and second friction element, movement of the valve spool and lands alternately connecting the pressure source and exhaust passage means to the second friction element.

5. The system of claim 2 wherein the system further comprises a control valve means hydraulically connected to the manual valve means, a second friction element, and a source of control pressure, the control valve means movable among various positions, each position producing an hydraulic communication through the control valve means due to application and removal of control pressure, for alternately connecting the pressure source and exhaust passage means to the second friction element.

6. A system for pressurizing and venting friction elements of an automatic transmission, comprising:
a source of pressurized fluid;
a sump having a fluid level;
a first passage that is pressurized to produce reverse drive and vented to discontinue reverse drive;
a second passage that is pressurized to produce forward drive and vented to discontinue forward drive; and
a manual valve comprising
a chamber;
a first port connecting the chamber to the fluid pressure source;

a second port connecting the chamber to the first passage;

a third port connecting the chamber to the second passage;

an exhaust port connecting the chamber to said exhaust passage means;

a spool located in the chamber, the spool movable among various positions within the manual valve, each position associated with locating one or more of the lands of the spool to produce an hydraulic communication through the manual valve, the spool having a first land having a relatively small control area for slideably supporting the spool on a support surface and sealing the chamber, and mutually spaced larger lands for alternately connecting and disconnecting the first port, exhaust port, second port and third port;

exhaust passage means extending vertically above the sump fluid level, for connecting the manual valve means and first and second passages to the sump.

7. The system of claim 6 wherein the exhaust passage means comprises a duct hydraulically connected to the manual valve and friction elements, extending vertically therefrom to an end located above said manual valve and passages, said end communicating with the sump.

8. The system of claim 6 wherein the system further comprises a control valve means hydraulically connected to the manual valve, a second friction element, and a source of control pressure, the control valve means movable among various positions, each position producing an hydraulic communication through the control valve means due to application and removal of control pressure, for alternately connecting the pressure source and exhaust passage means to the second friction element.

9. The system of claim 8 wherein the control valve means comprises:

a valve spool located in a valve bore and supported therein for sliding movement, the spool having control lands;

the valve bore connectable to the pressure source through operation of the manual valve, exhaust passage means, control pressure source, and second friction element, movement of the valve spool and lands alternately connecting the pressure source and exhaust passage means to the second friction element.

10. The system of claim 7 wherein the system further comprises a control valve means hydraulically connected to the manual valve, a second friction element, and a source of control pressure, the control valve means movable among various positions, each position producing an hydraulic communication through the control valve means due to application and removal of control pressure, for alternately connecting the pressure source and exhaust passage means to the second friction element.

11. A system for pressurizing and venting a friction element of an automatic transmission, comprising:

a source of pressurized fluid;

a sump having a fluid level;

a friction element that is engaged and released in response to the pressurized and vented state of the friction element; and a manual valve comprising
a chamber
a first port connecting the chamber to the fluid pressure source;

a second port connecting the chamber to the friction element;

an exhaust port connecting the chamber to said exhaust passage means;

a spool located in the chamber, moveable among various positions within the manual valve, each position associated with locating one or more of the lands of the spool to produce an hydraulic communication through the manual valve, the spool having a first land having a relatively small control area for slideably supporting the spool on a support surface and sealing the chamber, and mutually spaced larger lands for alternately connecting and disconnecting the first port, exhaust port and second port;

said exhaust passage means extending vertically above the friction element and manual valve means, for connecting the manual valve means and friction element to the sump.

12. The system of claim 11 wherein the exhaust passage means comprises a duct hydraulically connected to the manual valve and friction element, extending vertically therefrom to an end located above said sump level, said end communicating with the sump.

13. The system of claim 11 wherein the system further comprises a control valve means hydraulically connected the manual valve, friction element, and a source of control pressure, the control valve means movable among various positions, each position producing an hydraulic communication through the control valve means due to application and removal of control pressure, for alternately connecting the pressure source and exhaust passage means to the friction element.

14. The system of claim 13 wherein the control valve means comprises:

a valve spool located in a valve bore, and supported therein for sliding movement, the spool having control lands;

the valve bore connectable to the pressure source through operation of the manual valve, exhaust passage means, control pressure source, and friction element, movement of the valve spool and lands alternately connecting the pressure source and exhaust passage means to the friction element.

15. The system of claim 12 wherein the system further comprises a control valve means hydraulically connected the manual valve, a second friction element, and a source of control pressure, the control valve means movable among various positions, each position producing an hydraulic communication through the control valve means due to application and removal of control pressure, for alternately connecting the pressure source and exhaust passage means to the second friction element.

16. The system of claim 11 wherein the manual valve includes:

a passage connecting the second port and exhaust port when the spool is located in the chamber such that a large land closes communication between the first port and second port;

a pressure area formed on the spool, substantially equal to the difference between the control areas of the small land and said large land, facing the control area of said large land; and means connecting the pressure area and connecting passage.

17. The system of claim 16 wherein the spool has a bore extending along its length and further comprising:
  a cap fixed against displacement on the chamber, sealing the chamber against passage of hydraulic fluid;
  a piston located within the bore for sealing sliding contact therebetween, fixed against displacement to the cap, the piston and bore producing a pressure seal therebetween.

* * * * *